United States Patent Office 3,467,681
Patented Sept. 16, 1969

3,467,681
1-AMINO-2-ARYLOXY-4-ARYLSULFON-AMIDO-ANTHRAQUINONES
Volker Hederich, Cologne-Deutz, and Günter Gehrke, Cologne-Flittard, Germany, assignors to Farbenfabriken Bayer Aktiengesellschaft, Leverkusen, Germany, a corporation of Germany
No Drawing. Continuation of application Ser. No. 387,515, Aug. 4, 1964. This application Feb. 14, 1968, Ser. No. 705,561
Claims priority, application Germany, Aug. 17, 1963, F 40,520
Int. Cl. C09b *1/52, 1/54;* D06p *3/52*
U.S. Cl. 260—373               7 Claims

ABSTRACT OF THE DISCLOSURE

Novel anthraquinone dyestuffs of the formula

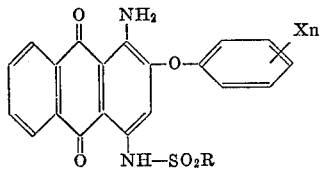

are prepared. The novel compounds are suitable for dyeing synthetic fibers. In the formula X is hydrogen, halogen, alkyl, hydroxyalkyl, alkoxy, hydroxyalkoxy or alkylmercapto, R is an aryl radical, and $n$ is one of the integers 1, 2 or 3.

---

This application is a continuation of Ser. No. 387,515, filed Aug. 4, 1964, and now abandoned.

This invention relates to novel anthraquinone dyestuffs and to procedure for their production. It is an object of the present invention to provide novel anthraquinone dyestuffs having superior properties. A further object is to provide novel dyestuffs for the dyeing and printing of polyester and other synthetic fibers. Still further objects and advantages will appear hereinafter.

It has been found that valuable anthraquinone dyestuffs of the formula:

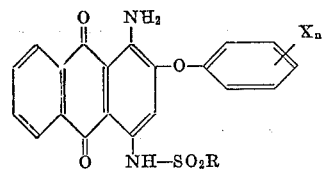

wherein X is hydrogen, halogen, alkyl, hydroxyalkyl, alkoxy, hydroxyalkoxy or alkylmercapto, R is an aryl radical, and $n$ is one of the integers 1, 2 or 3, may be produced by reacting 1-amino-4-aryl-sulfonamido-anthraquinones which contain exchangeable substituents in the 2-position, such as a sulfonic acid group or, preferably, a halogen atom, with substituted or unsubstituted phenols, or by reacting a corresponding 1,4-diamino-2-phenoxyanthraquinone with aryl-sulfohalides.

The reaction with the unsubstituted phenols is carried out in the presence of a strongly alkaline compound, such as potassium or sodium carbonate or hydroxide, preferably with an excess of the phenol in quesion, at temperatures between 100 and 180° C. Besides unsubstituted phenols, there may also be reacted substituted phenols, for example, 2-, 3- or 4-methylphenol, 2-ethylphenol, 3,5-dimethylphenol, 2,3,5-trimethylphenol, 2-, 3- or 4-methoxyphenol, 2-, 3- or 4-chlorophenol, 4-(β-hydroxyethyl)-phenol, 4-(β-hydroxyethoxy)-phenol, 4-methylmercaptophenol and the like.

The half-sided reaction of 1,4-diamino-2-phenoxyanthraquinones with aryl-sulfohalides can be carried out at 100–150° C. in solvents, such at toluene, chloro- or nitrobenzene, pyridine, dioxan or similar solvents, optionally in the presence of an acid-binding agent.

The aryl radical of the arylsulfonamide groups is preferably a phenyl radical which may be further substituted, for example, by lower alkyl or alkoxy radicals having preferably up to 4 carbon atoms, or by halogen or nitro groups. Consequently the following compounds can be used as arylsulfohalides, for example, benzene sulfochloride, 2- or 4-toluene sulfochloride, 4-methoxybenzene sulfochloride, 2,5-dimethoxybenzene sulfochloride, 4-chlorobenzene sulfochloride, 3,4-dichlorobenzene sulfochloride, 3- or 4-nitrobenzene sulfochloride and the corresponding sulfobromides.

The dyestuffs obtainable by the process according to the present invention are new and are suitable, singly and in mixtures with one another, for the dyeing of synthetic fibers, preferably of polyesters, such as linear aromatic polyesters, for example, polyethyleneglycol terephthalates or polyesters of dimethyl cyclohexane and terephthalic acid. They are dyed by the methods customary for these fibers, for example, in the presence of carriers at 100° C. or preferably at 110–130° C. under pressure. They are also very suitable for dyeing by the thermosol process by which the dyestuffs are fixed by brief heating to temperatures of about 200° C. Preferably prior to the dyeing, the dyestuffs are finely dispersed by known methods, optimally in the presence of dispersing agents.

On polyester fibers the new dyestuffs produce clear red dyeings with excellent fastness properties, for example, with very good fastness to wet processing, outstanding fastness to light and very good fastness to sublimation and thermofixation.

The following non-limitative examples illustrate the invention. The parts given are by weight.

EXAMPLE I

Four parts of anhydrous potassium carbonate are dissolved at 150° C. in 60 parts of phenol. After adding 5 parts of 1-amino-2-bromo-4-p-toluenesulphonamido-anthraquinone, the melt is maintained at 150° C. for 6 hours, subsequently cooled to 60° C. and treated with 25 parts of methyl alcohol. After suction-filtration, the crystalline reaction product is washed with 50% aqueous methyl alcohol and hot water and dried at 90° C. 4.9 parts of 1 - amino-2-phenoxy-4-p-toluene-sulphonamido-anthraquinone are obtained which crystallizes from toluene in the form of long needles of melting point 194–196° C.

A fabric of polyester fibers (polyethyleneglycol terephthalate) is impregnated on the foulard with a liquor containing per litre 20 g. of the dyestuff according to Example I which has previously been finely divided in the presence of dispersing agents. The fabric is then squeezed to a weight increase of about 70% and dried at 100° C. The fabric is then treated for 60 seconds with hot air at 190–210° C. in order to fix the dye, and then rinsed, washed with hot water and dried. A clear red dyeing with excellent fastness to light and sublimation is obtained.

EXAMPLE II

Twelve parts of 1-amino-2-bromo-4-p-toluenesulphonamidoanthraquinone are introduced into a melt of 60 parts of hydroquinone monomethyl ether and 6 parts of anhydrous postassium carbonate. The reaction is completed after 4 hours at 150° C. After processing with methanol and water as described in Example I, 10 parts of 1 - amino-2-(4'-methoxy - phenoxy)-4-p-toluene-sulphonamido-anthraquinone are obtained which crystallizes from glycol monoethyl ether in light-red rhombic crystals of melting point 194° C.

With one part of this dyestuff, which has previously been finely divided in the presence of dispersing agents, 100 parts of polyester fibres (polyethyleneglycol terephthalate) are dyed in 3000 parts of water for one hour at 125–130° C. A brilliant red dyeing is obtained with very good fastness to light and excellent fastness to sublimation.

EXAMPLE III

From 60 parts of 3-chlorophenol and 6 parts of anhydrous potassium carbonate a melt is prepared at 130° C. into which 10 parts of 1-amino-2-bromo-4-p-toluenesulphonamido-anthraquinone are introduced. After heating at 150° C. for 2 hours the reaction is completed. Processing is carried out with 30 parts of methyl alcohol in the manner described in Example I. 8.8 parts of 1-amino-2-(3'-chlorophenoxy)-4-p-toluenesulphonamido - anthraquinone are obtained which crystallizes from butanol as long needles of melting point 214–215° C.

On polyester fibres (polyethyleneglycol terephthalate) a slightly bluish red dyeing with very good fastness to light and sublimation is obtained.

EXAMPLE IV

Sixty parts of phenol, 10 parts of p-toluenesulphonamide, 5 parts of anhydrous potassium acetate and 0.1 part of copper acetate are heated together with 10 parts of 1-amino-2,4-dibromoanthraquinone for 3½ hours at 120–130° C. Five parts of anhydrous potassium carbonate are then introduced into the melt. The temperature is gradually raised to 150° C. and maintained for 5 hours. After cooling to 80° C., 50 parts of methyl alcohol are added. The crystallized dyestuff is filtered off with suction, washed with hot water and dried. 11.3 parts of the 1-amino-2-phenoxy - 4 - p - toluenesulphonamido-anthraquinone described in Example I are obtained.

EXAMPLE V

Five parts of 1,4-diamino-2-phenoxy-anthraquinone are heated at 130° C. for 8 hours with 6 parts of p-toluenesulphochloride in 35 parts of nitrobenzene. After cooling, the reaction mixture is treated with 1.5 parts of sodium carbonate and the nitrobenzene distilled off with steam. 6.8 parts of a dyestuff which is identical with the product prepared according to Example I are thus obtained.

EXAMPLE VI

Into a melt of 60 parts of phenol and 10 parts of powdered sodium hydroxide there are introduced at 110° C. 10 parts of the sodium salt of 1-amino-4-p-toluene-sulphonamido-anthraquinone-2-sulphonic acid. The reaction mixture is subsequently heated at 150° C. until no more starting material can be detected. The mixture is allowed to cool to 80° C., treated with 50 parts of methanol and 5 parts of water, the separated crystals are filtered off with suction and washed with 50% methanol and hot water. After drying, 6.6 parts of the dyestuff described in Example I are obtained.

EXAMPLE VII

Five parts of 1,4-diamino-2-phenoxy-anthraquinone are dissolved in 60 parts of pyridine and mixed with 5 parts of 4-chlorobenzene-sulphochloride. The reaction mixture is heated to the boil for 15 minutes and subsequently cooled to 80° C. By the addition of 20 parts of water, the reaction product precipitates. After filtering off with suction and washing with methanol, 6.9 parts of 1-amino-2-phenoxy-4-p-chlorobenzene sulphonamido-anthraquinone are obtained which crystallizes from toluene in the form of red needles of melting point 234–235° C.

On polyester fibres (polyethyleneglycol terephthalate) the dyestuff produces a red dyeing of excellent fastness properties.

When, instead of 4-chlorobenzene-sulphochloride, there is used 3,4-dichlorobenzene-sulphochloride or 4-nitrobenzene-sulphochloride similar dyestuffs are obtained.

EXAMPLE VIII

Nine parts of 1-amino-2-bromo-4-(3'-nitrobenzene-sulphonamido)-anthraquinone are introduced into a melt of 60 parts of phenol and 6 parts of anhydrous potassium which is then heated at 150° C. for 5 hours. The reaction mixture is cooled to 80° C., treated with 35 parts of methanol and 5 parts of water, filtered off with suction when cold and washed with methanol and water. 8.2 parts of a dyestuff are obtained which dyes polyester fibres (polyethyleneglycol terephthalate) in red shades. The dyeings are distinguished by excellent fastness properties.

When, instead of 1-amino-2-bromo-4-(3'-nitrobenzene-sulphonamido) _ anthraquinone, 1-amino-2-bromo-4-benzene-sulphonamido-anthraquinone or 1-amino-2-bromo-4-o-toluene-sulphonamido-anthraquinone are reacted with phenol, then similar dyestuffs are obtained.

EXAMPLE IX

Ten parts of 1-amino-2-bromo-4-p-toluene-sulphonamido-anthraquinone are introduced into a melt of 100 parts of p-methylmercaptophenol at 150° C. The reaction is completed after 2 hours at 150° C. The reaction mixture is cooled to 60° C., diluted with 100 parts of methanol, filtered off and washed with methanol/water. There are obtained 9.8 parts of 1-amino-2-(4'-methylmercaptophenoxy) - 4 - p - toluene-sulfonamido-anthraquinone, which crystallizes from benzene at 203–205° C.

With one part of the dyestuff, which has previously been finely divided, 100 parts of polyester fibers (polyethyleneglycol terephthalate) are dyed in 4000 parts of water in the presence of 15 parts of o-cresotic acid methyl ester as carrier for 2 hours at boiling temperature. A red dyeing is obtained with very good fastness to light and to sublimation.

What is claimed is:

1. A 2,4-diaryl-substituted anthraquinone dyestuff for the dyeing of polyester and other synthetic fibers of the formula

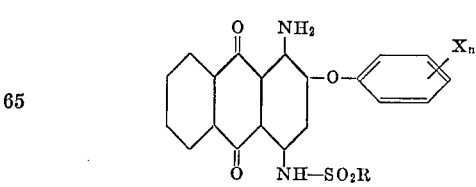

wherein X is hydrogen, halogen, alkyl, hydroxyalkyl, alkoxy, hydroxyalkoxy or alkylmercapto, $n$ is 1, 2 or 3 and R is phenyl or phenyl substituted by at least one lower alkyl, lower alkoxy, halogen or nitro moieties.

2. A dyestuff according to claim 1 wherein R is phenyl substituted by methyl.

3. A dyestuff according to claim 1 wherein X is hydrogen, $n$ is 1 and R is phenyl substituted by methyl.

4. A dyestuff according to claim 1 wherein X is methoxy, $n$ is 1 and R is phenyl substituted by methyl.

5. A dyestuff according to claim 1 wherein X is chlorine, $n$ is 1 and R is phenyl substituted by methyl.

6. A dyestuff according to claim 1 wherein X is hydrogen, $n$ is 1 and R is phenyl substituted by chlorine.

7. A dyestuff according to claim 1 wherein X is methylmercapto, $n$ is 1 and R is phenyl substituted by methyl.

References Cited

UNITED STATES PATENTS

| | | | |
|---|---|---|---|
| 2,773,071 | 12/1956 | Pizzarello et al. | 260—380 |
| 3,087,773 | 4/1963 | Straley et al. | 260—373 XR |

FOREIGN PATENTS 1,332,482  6/1963  France.

OTHER REFERENCES

Hauben, Das Anthracen und die Anthrachinone Leipzig, Germany, Georg Thieme Verlag (1929) page 434.

LORRAINE A. WEINBERGER, Primary Examiner

H. C. WEGNER, Assistant Examiner

U.S. Cl. X.R.

8—39